United States Patent [19]

Williams

[11] 4,303,356
[45] Dec. 1, 1981

[54] DEBURRING TOOL

[76] Inventor: David B. Williams, 106 W. Mechanic St., Corinth, N.Y. 12822

[21] Appl. No.: 110,122

[22] Filed: Jan. 7, 1980

[51] Int. Cl.³ .............................................. B23B 51/16
[52] U.S. Cl. .................................................. 408/187
[58] Field of Search ................ 408/187, 188, 194, 713

[56] References Cited

U.S. PATENT DOCUMENTS

| 2,620,689 | 12/1952 | Cogsdill | 408/187 |
| 2,959,109 | 11/1960 | Buchan | 408/187 |
| 3,170,224 | 2/1965 | Johnson | 408/188 |
| 3,540,325 | 11/1970 | Artaud | 408/107 |
| 3,827,821 | 8/1974 | Swenson | 408/187 |

FOREIGN PATENT DOCUMENTS 650246  8/1937  Fed. Rep. of Germany ...... 408/187

Primary Examiner—William R. Briggs
Attorney, Agent, or Firm—Robert R. Jackson; Charles B. Smith

[57] ABSTRACT

A tool and method for deburring the edge of a hole through a plate, pipe, duct, or similar workpiece. The edge to be deburred is the edge away from the operator of the tool, e.g., the edge on the far side of the plate or on the inside of the pipe or duct. The tool has a pivotal deburring blade at the distal end of a longitudinal member. The blade is pivoted substantially parallel to the longitudinal member for insertion of the tool through or withdrawal of the tool from the hole. The blade is pivoted substantially perpendicular to the longitudinal member for deburring the edge of the hole. Pivoting of the blade is controlled without direct manipulation of the blade by the operator and without the use of any other members.

2 Claims, 9 Drawing Figures

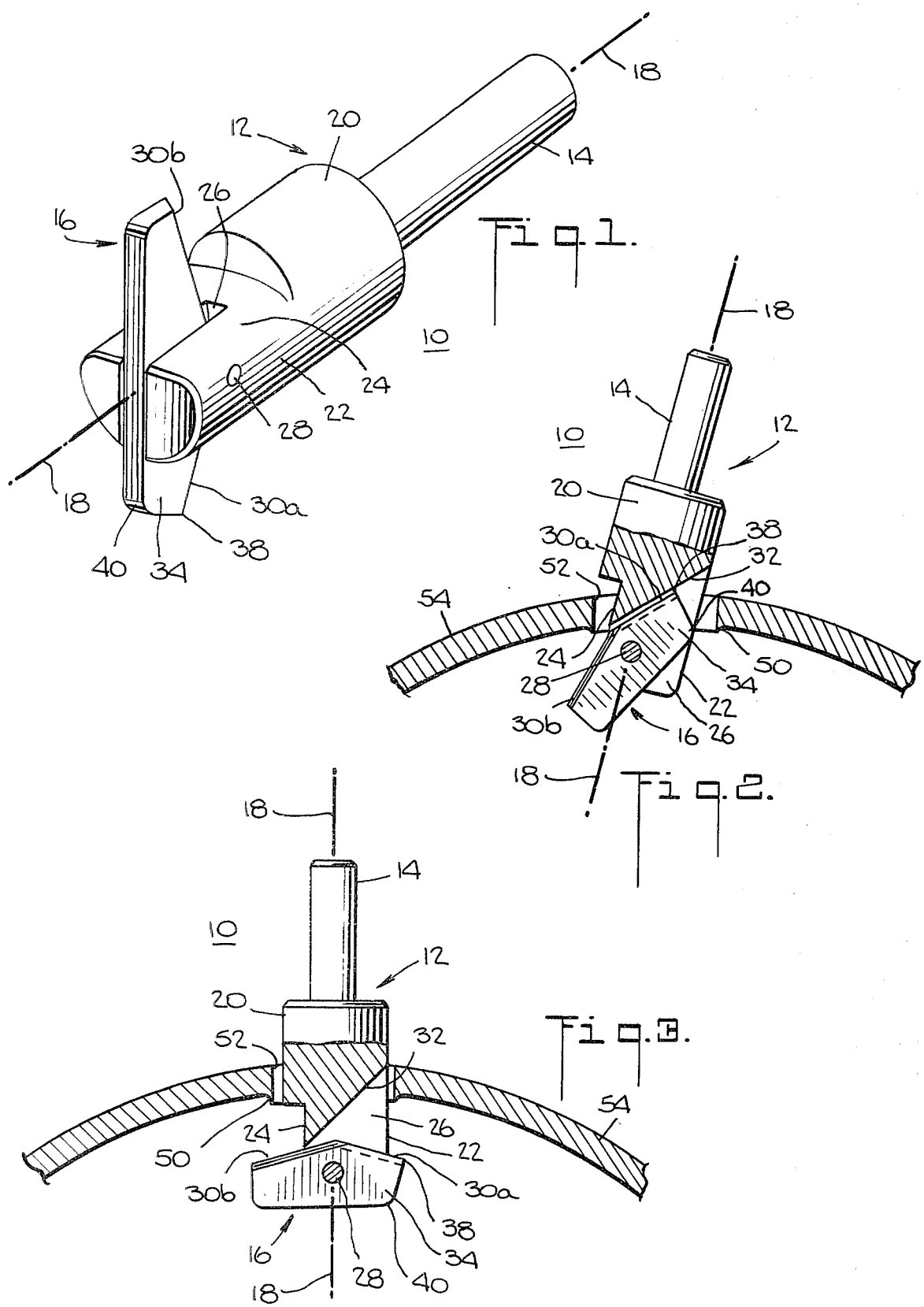

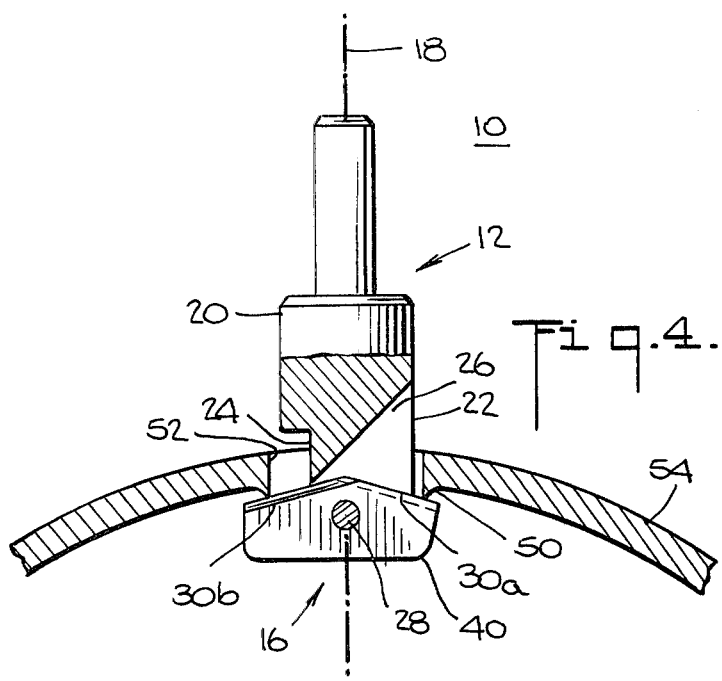
Fig. 4.
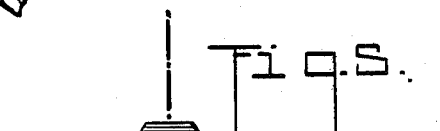
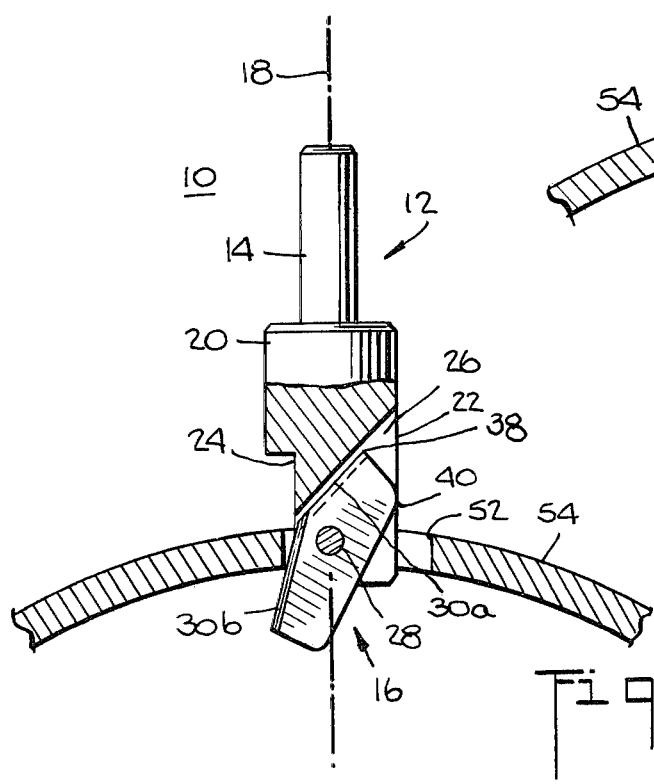
Fig. 6.

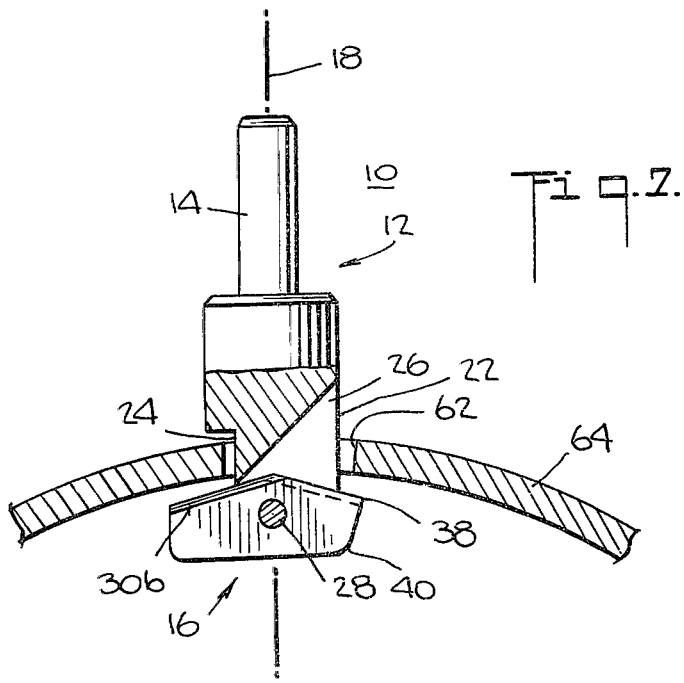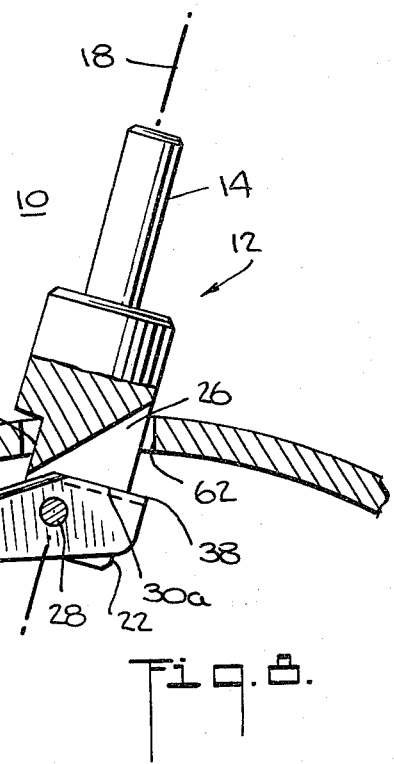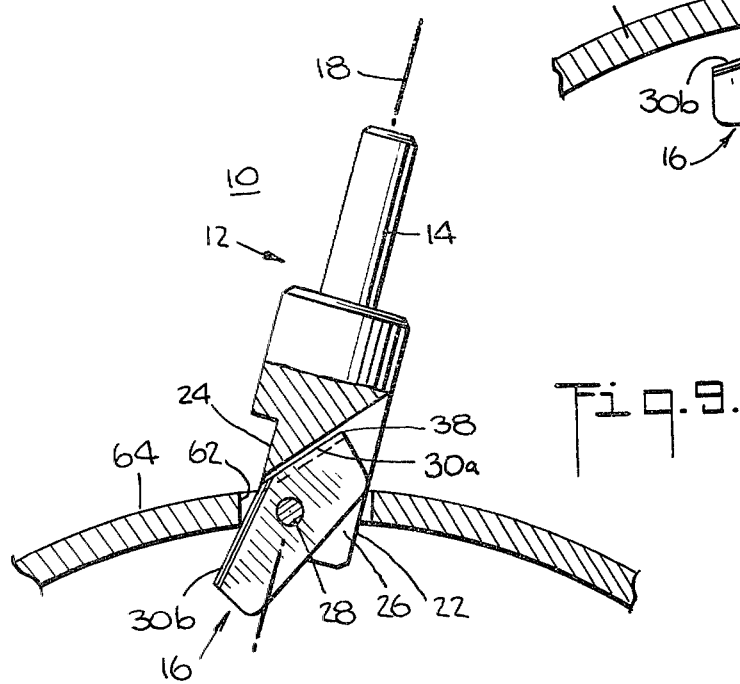

DEBURRING TOOL

BACKGROUND OF THE INVENTION

This invention relates to tools and methods for removing the raised edge or burr which is left when a hole is drilled, punched, or similarly formed through a plate, pipe, duct, or similar workpiece. The tool and method of this invention are particularly intended for removing the burr on the edge of a hole away from the operator of the tool, e.g., the burr on the edge of a hole on the side of a plate away from the operator or on the inside of a pipe or duct.

Tools for deburring the remote edges of holes through plates, pipes, ducts, and the like are known. Typically, these tools include a longitudinal shaft having a pivotal deburring blade at or near the remote or distal end of the shaft. The shaft is inserted through the hole while the deburring blade is pivoted substantially parallel to the shaft in an inoperative position. When the blade is through the hole, the blade is pivoted out substantially perpendicular to the shaft into an operative position. The shaft is then rotated and the tool is pulled outwardly of the hole so that the blade engages and eventually removes the burr. When the burr has been removed to the desired degree, the blade is pivoted back into the inoperative position in the shaft so that the tool can be removed from the hole.

In general, the pivoting of the blade in the prior art deburring tools described above is positively controlled by means accessible to the operator from the near side of the hole. Control of the blade from the near side of the hole is desirable for operator convenience, and in many instances is absolutely essential if the operator cannot reach the inside of the hole, as in the case of a hole through a long pipe or duct. Typically, the means for controlling the pivoting of the blade in these prior art tools includes additional elements associated with the shaft, at least one of which extends through the hole substantially parallel to the shaft. The operator manipulates this apparatus (e.g., by reciprocating it) to position the blade.

This additional apparatus in prior art deburring tools greatly complicates these tools and may substantially increase their cost. The relatively large number of moving parts in these tools renders them more susceptible to damage and wear and reduces their reliability. The burr material removed by these tools can become lodged in the moving parts of the tools and cause them to jam.

In view of the foregoing, it is an object of this invention to improve and simplify tools and methods for deburring the edges of holes remote from the operator of the tool.

It is a more particular object of this invention to provide a deburring tool for use in removing the burrs on the remote edges of holes in which the blade can be controlled solely by simple manipulation of the tool relative to the hole and without the need for any additional elements for positioning the blade.

SUMMARY OF THE INVENTION

These and other objects of the invention are accomplished in accordance with the principles of the invention by providing a deburring tool having a blade which is pivotally mounted in a slot in the distal end portion of a longitudinal member. The blade is initially pivoted into the slot substantially parallel to the longitudinal member and the distal end portion of the member is inserted through the hole. The tool is then rotated and the blade pivots out of the slot substantially perpendicular to the longitudinal member as a result of centrifugal force acting on the blade. When the edge of the hole has been deburred, rotation of the tool is stopped. The distal end portion of the longitudinal member is shaped to allow lateral and in some cases pivotal movement of the tool in the hole so that one end of the blade clears the adjacent side of the hole. As the tool is then withdrawn from the hole, contact of the other end of the blade with the side of the hole adjacent that end of the blade causes the blade to pivot back into the slot in the longitudinal member. Uneven weight distribution along the length of the blade can be used in some instances to assist the pivoting of the blade back into the slot.

The method of the invention is operation of the tool as summarized above to insert the tool through the hole, deburr the edge of the hole, and withdraw the tool from the hole.

Further features of the invention, its nature and various advantages will be more apparent from the accompanying drawing and the following detailed description of the invention.

BRIEF DESCRIPTION OF THE DRAWING

FIG. 1 is a perspective view of a deburring tool constructed in accordance with the invention.

FIG. 2 is an elevational view, partly in section, showing the deburring tool of FIG. 1 being inserted into a hole in a pipe prior to use of the tool to deburr the inside edge of the hole.

FIG. 3 is a view similar to FIG. 2 showing the deburring tool of FIG. 1 after insertion into the hole of FIG. 2 and when ready to begin deburring the inside edge of the hole.

FIG. 4 is a view similar to FIGS. 2–3 showing the deburring tool of FIG. 1 during deburring of the inside edge of the hole of FIGS. 2–3.

FIG. 5 is a view similar to FIGS. 2–4 showing the deburring tool of FIG. 1 after the inside edge of the hole of FIGS. 2–4 has been deburred and the tool has been positioned to begin withdrawal from the hole.

FIG. 6 is a view similar to FIGS. 2–5 showing the deburring tool of FIG. 1 being withdrawn from the hole of FIGS. 2–5.

FIG. 7 is a view similar to FIGS. 2–6 showing the deburring tool of FIG. 1 after the inside edge of a hole which is smaller than the hole in FIGS. 2–6 has been deburred and the tool has been moved to an initial position for withdrawal from the hole.

FIG. 8 is a view similar to FIG. 7 showing the deburring tool of FIG. 1 after the tool has been moved to a further position for withdrawal from the hole of FIG. 7.

FIG. 9 is a view similar to FIGS. 7–8 showing the deburring tool of FIG. 1 being withdrawn from the hole of FIGS. 7–8.

DETAILED DESCRIPTION OF THE INVENTION

Although the apparatus and method of this invention are described and illustrated in their application to deburring the inside edge of a hole through a pipe, it will be understood that the invention is equally applicable to deburring the remote edges of holes through any similar platelike workpiece such as a plate or the wall of a duct. Accordingly, it will be understood that the term "plate" or "platelike workpiece" is used herein and in the appended claims to include any of these types of workpieces.

As shown, for example, in FIGS. 1 and 2, the deburring tool 10 of this invention includes a longitudinal member 12 having a shank 14 at one end and a pivotally mounted blade 16 at the other end. Shank 14 is adapted for engagement with means (not shown) for rotating the tool about its longitudinal axis 18. Suitable means for rotating the tool include a hand-held portable electric drill or a stationary drill press. Shank 14 fits into the chuck of the drill apparatus. Shank end 14 is typically proximate the operator of the tool and is accordingly referred to herein as the proximal end portion of the tool. The opposite end portion of the tool is referred to herein as the distal end portion.

Longitudinal member 12 has several substantially cylindrical sections along its length, it being understood that the term "cylindrical" is used in the general sense and is not limited to circular cylinders. These cylindrical sections include proximal shank 14 (described above), an intermediate circular cylindrical section 20, and a distal end portion 22. Distal end portion 22 is a continuation of intermediate section 20, but with one side 24 recessed or substantially flattened. Distal end portion 22 also includes a slot 26 parallel to (and preferably coincident with) longitudinal axis 18 and perpendicular to flattened surface 24. The diameter of distal end portion 22 (i.e., the diameter of the smallest circle circumscribing portion 22, which in this case corresponds to the diameter of circular intermediate section 20) is less than the diameter of the holes with which the tool is to be used. The lateral sides of flattened surface 24 are preferably rounded to effect a gradual transition into the larger radius on the opposite side of distal end portion 22 and to increase the possible lateral motion of the tool in the hole as described in detail below.

Blade 16 is pivotally mounted in slot 26, typically on pin 28 which extends between the two lateral halves of distal end portion 22 perpendicular to slot 26 and preferably intersecting longitudinal axis 18. Pin 28 is preferably removable to facilitate sharpening and/or replacement of blade 16. The longitudinal axis of pin 28 defines the pivotal axis of blade 16. Blade 16 has cutting edges 30a and 30b on its proximal surface. Blade 16 is longer (measured substantially parallel to its cutting edges) than the diameter of the holes with which it will be used. However, the depth of blade 16 (measured parallel to slot 26 and perpendicular to the length of the blade) is substantially less than the diameter of the holes with which it will be used.

In the particular embodiment shown in the drawing, cutting edges 30a and 30b are sloped away from one another to facilitate use of the tool on the inside of a pipe. The amount of the slope may depend on the diameter of the pipe with which the tool is used. If the tool is to be used with flat plates, the cutting edges may be co-linear.

The proximal end 32 of slot 26 is located proximally of the pivotal axis defined by pin 28 so that substantially all of the portion 34 of blade 16 adjacent the unflattened side of distal end portion 22 can pivot into the slot as shown, for example, in FIG. 2. In this position the blade is said to be substantially parallel to longitudinal member 12, although as shown in the drawing there is preferably still a significant angle between blade 16 and longitudinal axis 18. Preferably, the proximal end 32 of slot 26 stops the blade when blade portion 34 is substantially fully pivoted into the slot. This prevents blade 16 from turning completely around in the slot and keeps the cutting edges 30a and 30b on the proximal side of the blade.

The flattened side 24 of distal end portion 22 is dimensioned longitudinally of the tool so that when blade 16 is pivoted out substantially perpendicular to longitudinal axis 18 as shown, for example, in FIG. 1, flattened portion 24 extends proximally of the cutting edge of blade 16 a distance greater than the thickness of the workpieces with which the tool will be used. In addition, flattened portion 24 extends distally of the cutting edge of blade 16 when the blade is substantially perpendicular to longitudinal axis 18 at least to the transverse plane perpendicular to longitudinal axis 18 which includes the pivotal axis of blade 16. The reasons for these dimensional parameters will become apparent when the operation of the tool is described.

The extent to which surface 24 is recessed or flattened is also important. Surface 24 is recessed so that when blade 16 is substantially perpendicular to longitudinal axis 18 (as shown, for example, in FIG. 1), the distance from surface 24 to the extreme opposite end 38 of blade 16 is less than the diameter of the holes with which the tool is to be used. Again, the reason for this dimensional parameter will become apparent when operation of the tool is described. The lateral sides of flattened surface 24 are also preferably rounded as mentioned above.

FIGS. 2-6 show successive stages in use of tool 10 to remove burr 50 on the inside edge of hole 52 through the wall of pipe 54. Accordingly, FIGS. 2-6 illustrate successive steps in the method of using tool 10 in accordance with this invention as will now be explained. FIGS. 7-9 illustrate successive steps in a variation of a portion of the method of the invention when tool 10 is used with smaller holes than shown in FIGS. 2-6.

In FIG. 2, with the tool not rotating, blade 16 is pivoted into slot 26 (e.g., by a manual operation of the operator) and the distal end portion of the tool is inserted through the hole. In FIG. 3, the tool with the blade inside the pipe is rotated about its longitudinal axis by suitable drive means (not shown, but described above). Rotation of the tool produces centrifugal forces on blade 16 which cause the blade to pivot out of slot 26 substantially perpendicular to longitudinal axis 18. When blade 16 is pivoted out as described above, the tool is pulled back toward the hole so that cutting edges 30a and 30b contact and begin to remove burr 50 as shown in FIG. 4.

When burr 50 has been removed to the desired degree, rotation of the tool is stopped. The tool is then moved laterally relative to the hole parallel to blade 16 in the direction of flattened surface 24 as shown in FIG. 5. In this position, the end of blade 16 remote from surface 24 (i.e., end 38) may clear the adjacent side of the hole as shown in FIG. 5. In that event, the tool can be pulled straight out of the hole as shown in FIG. 6. As the tool is pulled out of the hole, cutting edge 30b contacts the adjacent side of the hole causing blade 16 to pivot back into slot 26 and allowing the tool to be withdrawn freely from the hole.

If the end 38 of blade 16 does not clear the adjacent side of the hole when the blade is moved laterally as shown in FIG. 5 because the hole is too small relative to the size of the tool (see, for example, FIG. 7 showing smaller hole 62 through pipe 64), the necessary clearance is obtained in accordance with the method of the invention by additionally pivoting longitudinal member 12 substantially about the pivotal axis of blade 16 in a direction away from surface 24 while keeping surface 24 as close as possible to the adjacent side of the hole. As shown in FIG. 8, the effect of this additional pivoting of longitudinal member 12 is to translate blade 16 in a direction away from end 38, thereby gaining the necessary clearance between end 38 and the adjacent side of the hole. The tool is now pulled out of the hole as shown in FIG. 9, keeping surface 24 or cutting edge 30b as close as possible to the adjacent side of the hole. Again, cutting edge 30b contacts the adjacent side of the hole causing blade 16 to pivot back into slot 26 and allowing the tool to be withdrawn freely from the hole.

The reasons for the above-described dimensional parameters of surface 24 will now be apparent. Surface 24 must extend proximally of cutting edge 30b a distance at least equal to the thickness of the workpiece so that the tool can be readily moved laterally as shown in FIGS. 5 and 7. In addition, surface 24 must be recessed sufficiently so that the opposite end 38 of the blade clears the adjacent side of the hole, either when the tool is moved laterally as shown in FIG. 5 or when the tool is moved laterally and then pivoted as shown in FIG. 8. The rounded lateral sides of surface 24 advantageously increase the amount of lateral movement which can be achieved. Finally, surface 24 must extend distally of cutting edge 30b at least to the transverse plane perpendicular to longitudinal axis 18 which includes the pivotal axis of the blade so that the blade will be pivoted back into slot 26 by contact with one side of the hole as the tool begins to be withdrawn from the hole as shown in FIG. 6 or FIG. 9. The end portion 34 of blade 16 may be slightly undercut or rounded as shown at 40 to make sure that no part of that end of the blade contacts the adjacent side of the hole as the blade pivots into the longitudinal member during withdrawal of the tool.

Additional features of the tool not previously described take advantage of gravitational forces to facilitate use of the tool at least when the tool is used with a predetermined orientation relative to gravity. For example, if the tool is generally used with the distal end downward as shown in all of the Figures, the end of blade 16 adjacent recessed surface 24 can be made heavier than the other end of the blade so that the blade tends to pivot into slot 26 whenever the tool is not rotating. In the particular embodiment shown in the drawing, the blade is weighted in this manner by removing some blade material at 40. To the extent that the blade pivots into slot 26 by itself, the amount by which surface 24 must be recessed can be correspondingly reduced. If the tool is generally to be used with the distal end upward, gravitational forces can be taken advantage of in the same way by reversing the blade so that the lighter end is adjacent surface 24. In general, the center of gravity of blade 16 can be located relative to its pivotal axis in any way to make similar use of gravitational force for any given orientation of the tool relative to gravity. Of course, if the tool is intended for use with any orientation relative to gravity (i.e., universal application), it may be preferable to have the blade substantially balanced relative to its pivotal axis.

In a preferred embodiment, longitudinal member 12 is cast or machined steel and blade 16 is hardened tool steel. The speed at which the tool is rotated during a deburring operation typically depends on the material of the workpiece.

Although the invention has been described in relation to a particular embodiment thereof, it will be understood that various modifications can be made without departing from the scope and spirit of the invention. For example, different materials can be used for the various parts of the tool depending on the intended applications of the tool. Similarly, the tool can be made in any size for use in deburring the edges of holes of any size.

What is claimed is:

1. A tool for deburring the edge of a hole through a platelike workpiece, the edge to be deburred being on the side of the workpiece away from the operator of the tool, and the deburring being in a direction toward the operator of the tool, comprising:

a longitudinal member including a proximal end portion adapted for engagement with means for rotating the longitudinal member about its longitudinal axis, and a cylindrical distal end portion having diameter less than the diameter of the hole and having a transverse slot parallel to the longitudinal axis; and a cutting blade pivotally mounted in the slot on a pivotal axis perpendicular to the slot and the longitudinal axis, the length of the blade being greater than the diameter of the hole and the depth of the blade being substantially less than the diameter of the hole, the blade being mounted so that when the blade is perpendicular to the longitudinal axis, the opposite first and second end portions of the blade project from opposite sides of the distal end portion;

a first side of the distal end portion perpendicular to the slot and adjacent the first end portion of the blade being shaped so that it is substantially closer to the longitudinal axis than the opposite second side of the distal end portion, the distance between the first side of the distal end portion and the end of the second end portion of the blade when the blade is perpendicular to the longitudinal axis being less than the diameter of the hole; and the proximal end of the slot adjacent the second side of the distal end portion being located proximally of the pivotal axis so as to allow substantially all of the second end portion of the blade to pivot into the slot so that the tool can be inserted through and withdrawn from the hole when the tool is not being rotated and the blade is thus pivoted into the slot, the proximal end of the slot being further located so as to contact the second end portion of the blade when the blade is pivoted into the slot to prevent the second end portion of the blade from passing all the way through the slot, the mass of the blade being distributed so that when the blade is pivoted into the slot with the second end portion of the blade in contact with the proximal end of the slot, rotation of the tool about its longitudinal axis produces centrifugal forces on the blade which pivot the blade out of the slot perpendicular to the longitudinal axis of the tool, the distance between the first side of the distal end portion and the end of the second end portion of the blade when the blade is perpendicular to the longitudinal axis being small enough so that when the tool is not rotating about its longitudinal axis and the first side of the distal end portion is placed in contact with the side of the hole, the first end portion of the blade contacts the side of the hole and the blade can be pivoted into the slot by this contact so that the tool can be withdrawn from the hole.

2. The apparatus defined in claim 1 wherein the distance between the first side of the distal end portion and the end of the second end portion of the blade when the blade is perpendicular to the longitudinal axis is large enough so that the end of the second end portion of the blade contacts the edge of the hole when the longitudinal axis is perpendicular to the hole with the first side of the distal end portion in contact with the side of the hole and with the blade perpendicular to the longitudinal axis, and wherein pivoting the tool substantially about the pivotal axis in a direction away from the first side of the distal end portion while maintaining the first distal end portion adjacent the side of the hole moves the second end portion of the blade out of contact with the side of the hole so that only the first end portion of the blade contacts the side of the hole and causes the blade to pivot into the slot for withdrawal of the tool from the hole.

* * * * *